United States Patent
Yano

(10) Patent No.: US 11,204,184 B2
(45) Date of Patent: Dec. 21, 2021

(54) AIR-CONDITIONING APPARATUS WITH DIRT DETECTION

(71) Applicant: Mitsubishi Electric Corporation, Tokyo (JP)

(72) Inventor: Hirotoshi Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/970,141

(22) PCT Filed: Apr. 5, 2018

(86) PCT No.: PCT/JP2018/014599
§ 371 (c)(1),
(2) Date: Aug. 14, 2020

(87) PCT Pub. No.: WO2019/193714
PCT Pub. Date: Oct. 10, 2019

(65) Prior Publication Data
US 2020/0400325 A1    Dec. 24, 2020

(51) Int. Cl.
*F24F 11/32* (2018.01)
*F24F 11/63* (2018.01)
(Continued)

(52) U.S. Cl.
CPC .............. *F24F 11/32* (2018.01); *F24F 11/63* (2018.01); *G05B 19/042* (2013.01); *F24F 2110/10* (2018.01); *G05B 2219/2614* (2013.01)

(58) Field of Classification Search
CPC ........ F24F 11/30; F24F 11/32; F24F 2140/20; F24F 11/38; F24F 11/49; F24F 2110/10;
(Continued)

(56) References Cited

U.S. PATENT DOCUMENTS 6,871,160 B2 *   3/2005   Jaw ...................... G01M 15/00
                                                    700/108
7,587,908 B2 *   9/2009   Kim ....................... F24F 1/027
                                                    62/262
(Continued)

FOREIGN PATENT DOCUMENTS

EP    3 290 816 A1    3/2018
JP    S61-044239 A    3/1986
(Continued)

OTHER PUBLICATIONS

International Search Report of the International Searching Authority dated Jul. 10, 2018 for the corresponding International application No. PCT/JP2018/014599 (and English translation).

*Primary Examiner* — Darrin D Dunn
(74) *Attorney, Agent, or Firm* — Posz Law Group, PLC

(57) ABSTRACT

An air-conditioning apparatus includes: a suction-air temperature detection sensor that detects the temperature of air that is sucked into a heat exchange unit or the temperature of space to be subjected to heat exchange as a suction air temperature; a cooled/heated-air temperature detection sensor that detects the temperature of air blown from the heat exchange unit or the temperature of the heat exchange unit as a cooled/heated air temperature; and a control device, which includes a microcomputer or a hardware circuit. The control device acquires data on a temperature difference between the suction air temperature detected by the suction-air temperature detection sensor and the cooled/heated air temperature detected by the cooled/heated-air temperature detection sensor at different times as time-series data, and determines whether the heat exchange unit is dirty or not based on the time-series data regarding the temperature difference.

8 Claims, 2 Drawing Sheets

(51) Int. Cl.
*G05B 19/042* (2006.01)
*F24F 110/10* (2018.01)

(58) Field of Classification Search
CPC ... F24F 11/39; F24F 11/63; G05B 2219/2614; G05B 19/4184; G05B 2219/32234; G05B 23/0235; G05B 19/042; G05B 23/0283
See application file for complete search history.

(56) References Cited

U.S. PATENT DOCUMENTS

| | | | | |
|---|---|---|---|---|
| 8,126,574 | B2* | 2/2012 | Discenzo | G05B 23/0294 700/28 |
| 2009/0126899 | A1* | 5/2009 | Thybo | B60H 1/00978 165/11.1 |
| 2015/0067153 | A1* | 3/2015 | Bhattacharyya | H04L 43/0817 709/224 |
| 2016/0190799 | A1* | 6/2016 | Jayanth | H02H 7/20 361/30 |
| 2016/0238332 | A1* | 8/2016 | Lambert | F25D 29/008 |
| 2017/0082672 | A1* | 3/2017 | Schneider | G01R 31/40 |
| 2017/0279261 | A1* | 9/2017 | Riley | H02H 3/093 |
| 2018/0073960 | A1* | 3/2018 | Son | F24F 11/38 |
| 2018/0137129 | A1* | 5/2018 | Matsuo | G06F 16/93 |
| 2019/0039437 | A1* | 2/2019 | Jentz | B60H 1/025 |
| 2019/0154754 | A1* | 5/2019 | Daftari | G01D 3/08 |
| 2019/0309973 | A1* | 10/2019 | Zhang | F24F 11/39 |

FOREIGN PATENT DOCUMENTS

| | | |
|---|---|---|
| JP | H05-019835 U | 3/1993 |
| JP | H09-060951 A | 3/1997 |
| JP | 2002-061995 A | 2/2002 |
| JP | 2005-345046 A | 12/2005 |
| WO | 2016/174734 A1 | 11/2016 |

* cited by examiner

AIR-CONDITIONING APPARATUS WITH DIRT DETECTION

CROSS REFERENCE TO RELATED APPLICATION

This application is a U.S. national stage application of PCT/JP2018/014599 filed on Apr. 5, 2018, the contents of which are incorporated herein by reference.

TECHNICAL FIELD

The present disclosure relates to an air-conditioning apparatus that detects dirt on a heat exchanger or an air filter.

BACKGROUND ART

Air filters or heat exchangers employed in air-conditioning apparatuses are periodically cleaned. In the past, various methods have been proposed as methods for cleaning air filters in accordance with the degree of dirt on air filters. In these methods, the degree of dirt is determined based on temperatures detected by various temperature sensors (for example, see Patent Literatures 1 to 3). Patent Literature 1 discloses a method in which when the difference between the surface temperature of a condenser and the temperature of cooling air cooled by the condenser reaches or exceeds a threshold, it is determined that an air filter is clogged, and an alarm is thus output.

Patent Literature 2 discloses a method in which when it is detected that the difference between an indoor temperature and the temperature of refrigerant at an outlet of an evaporator reaches or exceeds a predetermined value, it is determined that an abnormality occurs in an air filter, and a suggestion that the air filter be cleaned is displayed. Patent Literature 3 discloses a method in which it is determined whether an air filter is clogged based on an accumulated operation time from the time of installation, and it is also determined whether the air filter is clogged based on the difference between an indoor temperature and the temperature of an indoor heat exchanger.

CITATION LIST

Patent Literature

Patent Literature 1: Japanese Unexamined Patent Application Publication No. Sho 61-44239
Patent Literature 2: Japanese Unexamined Utility Model Application Publication No. Hei 5-19835
Patent Literature 3: Japanese Unexamined Patent Application Publication No. 2002-61995

SUMMARY OF INVENTION

Technical Problem

As described above, in Patent Literatures 1 to 3, it is determined whether dirt that causes, for example, clogging, is present or not, based on the comparison between the temperature difference and the predetermined threshold. However, when a temporary environmental change occurs, for example, the indoor temperature rises to a high value, the temperature difference may exceed the predetermined threshold, and as a result, it may be detected by mistake that the air filter is dirty.

The present disclosure is applied to solve the above problem, and relates to an air-conditioning apparatus capable of accurately detecting the degree of dirt on an air filter or a heat exchanger regardless of an environmental change.

Solution to Problem

An air-conditioning apparatus of an embodiment of the present disclosure includes: a suction-air temperature detection unit that detects the temperature of air that is sucked into a heat exchange unit or the temperature of space to be subjected to heat exchange as a suction air temperature; a cooled/heated-air temperature detection unit that detects the temperature of air blown from the heat exchange unit or the temperature of the heat exchange unit as a cooled/heated air temperature; and a control device that acquires data on a temperature difference between the suction air temperature detected by the suction-air temperature detection unit and the cooled/heated air temperature detected by the cooled/heated-air temperature detection unit at different times as time-series data, and determines whether the heat exchange unit is dirty or not based on the time-series data regarding the temperature difference.

Advantageous Effects of Invention

In the air-conditioning apparatus according to the embodiment of the present disclosure, since it is determined whether the heat exchange unit is dirty or not based on the time-series data regarding the temperature difference. Thus, it is detected whether the heat exchange unit is dirty or not based on a fact in which when the heat exchange unit gets dirty, the temperature difference continues. It is therefore possible to accurately detect whether the heat exchange unit is dirty or not regardless of an environmental change.

DESCRIPTION OF EMBODIMENTS

Embodiment 1

Figure 1:
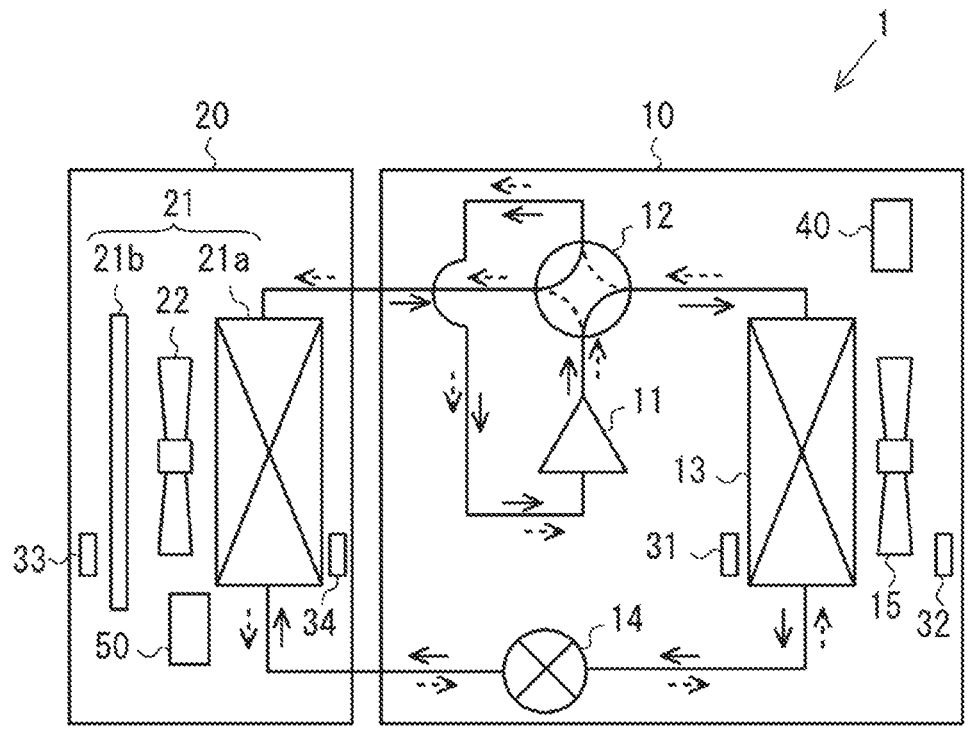
FIG. 1 is a schematic view illustrating an example of the configuration of an air-conditioning apparatus according to Embodiment 1.

An air-conditioning apparatus according to Embodiment 1 of the present disclosure will be described. FIG. 1 is a schematic view illustrating an example of the configuration of an air-conditioning apparatus 1 according to Embodiment 1. As illustrated in FIG. 1, the air-conditioning apparatus 1 includes an outdoor unit 10 and an indoor unit 20 that are connected by refrigerant pipes, whereby a refrigerant circuit is formed.

The outdoor unit 10 includes a compressor 11, a flow switching device 12, an outdoor heat exchange unit 13, and a pressure-reducing device 14. The compressor 11 sucks low-temperature, low-pressure refrigerant, compresses the sucked refrigerant into high-temperature, high-pressure refrigerant, and discharges the high-temperature, high-pressure refrigerant. The compressor 11 is, for example, an inverter compressor that is controlled in capacity, that is, in the amount of refrigerant to be sent per unit time, by changing the operating frequency of the compressor 11. The operating frequency of the compressor 11 is controlled by an outdoor control device 40.

The flow switching device 12 is, for example, a four-way valve, and switches the flow direction of the refrigerant to switch the operation between a cooling operation and a heating operation. During the cooling operation, as indicated by solid lines in FIG. 1, a flow passage in the flow switching device 12 is switched to a flow passage in which a discharge side of the compressor 11 and the outdoor heat exchange unit 13 are connected to each other. During the heating operation, as indicated by dashed lines in FIG. 1, the flow passage in the flow switching device 12 is switched to a flow passage in which the discharge side of the compressor 11 and the indoor unit 20 are connected to each other. The switching of the flow passage in the flow switching device 12 is controlled by the outdoor control device 40.

The outdoor heat exchange unit 13 is an outdoor heat exchanger that causes heat exchange to be performed between outdoor air and the refrigerant. During the cooling operation, the outdoor heat exchange unit 13 operates as a condenser that transfers heat of the refrigerant to the outdoor air to condense the refrigerant. During the heating operation, the outdoor heat exchange unit 13 operates as an evaporator that evaporates the refrigerant to cool the outdoor air with the heat of the evaporation. The outdoor air is supplied to the outdoor heat exchange unit 13 by an outdoor fan 15.

The pressure-reducing device 14 is, for example, an electronic expansion valve or a thermostatic expansion valve. The pressure-reducing device 14 reduces the pressure of the refrigerant to expand the refrigerant, and adjusts the flow rate of the refrigerant that flows in the refrigerant circuit. It should be noted that FIG. 1 illustrates the case where the pressure-reducing device 14 is provided in the outdoor unit 10; however, the pressure-reducing device 14 may be provided in the indoor unit 20.

The indoor unit 20 includes an indoor heat exchange unit 21 and an indoor fan 22. The indoor heat exchange unit 21 includes an indoor heat exchanger 21a and an air filter 21b. The indoor heat exchanger 21a causes heat exchange to be performed between indoor air supplied by the indoor fan 22 and water, thereby generating air for cooling or heating, that is, conditioned air that is supplied to an indoor space. The indoor fan 22 supplies air to the indoor heat exchanger 21a. The rotation speed of the indoor fan 22 is controlled by an indoor control device 50. The air filter 21b is provided on an air inlet side of the indoor heat exchanger 21a, and removes dust, etc., from air that is sucked into the indoor heat exchanger 21a.

The air-conditioning apparatus 1 further includes an outdoor suction-air temperature detection unit 31, an outdoor cooled/heated-air temperature detection unit 32, an indoor suction-air temperature detection unit 33 and an indoor cooled/heated-air temperature detection unit 34. The outdoor suction-air temperature detection unit 31 and the outdoor cooled/heated-air temperature detection unit 32 are provided in the outdoor unit 10, and the indoor suction-air temperature detection unit 33 and the indoor cooled/heated-air temperature detection unit 34 are provided in the indoor unit 20. The outdoor suction-air temperature detection unit 31 detects the temperature of air that is sucked into the outdoor heat exchange unit 13 or the temperature of space to be subjected to heat exchange, as a suction air temperature. The outdoor cooled/heated-air temperature detection unit 32 detects the temperature of air blown from the outdoor heat exchange unit 13 or the temperature of the outdoor heat exchange unit 13 as a cooled/heated air temperature. The indoor suction-air temperature detection unit 33 detects indoor suction-air temperature Ta of air that is sucked into the indoor heat exchange unit 21. The indoor cooled/heated-air temperature detection unit 34 detects the temperature of air blown from the indoor heat exchange unit 21 or the temperature of the indoor heat exchanger 21a as a cooled/heated air temperature.

The outdoor control device 40 and the indoor control device 50 execute software on an arithmetic unit such as a microcomputer to fulfill various functions or are made up of, for example, hardware such as circuit devices to fulfill various functions. The outdoor control device 40 controls the operation of the outdoor unit 10 based on information sent from sensors, for example, the outdoor suction-air temperature detection unit 31 and the outdoor cooled/heated-air temperature detection unit 32. The indoor control device 50 controls the operation of the outdoor unit 10 based on information sent from sensors, for example, the indoor suction-air temperature detection unit 33 and the indoor cooled/heated-air temperature detection unit 34.

In particular, it should be noted that in the air-conditioning apparatus 1, it is determined whether the outdoor heat exchange unit 13 or the indoor heat exchange unit 21 is dirty or not based on the suction air temperature and the cooled/heated air temperature. The following description is made by referring to by way of the case where the indoor control device 50 determines whether the indoor heat exchange unit 21 is dirty or not. This determination may be made by an arithmetic unit in any of the outdoor unit 10, a controller of the air-conditioning apparatus 1, a centralized controller in a network, and a server, or arithmetic units of the outdoor unit 10, the controller of the air-conditioning apparatus 1, the centralized controller in the network, and the server. Also, in addition to the determination of whether or not the indoor heat exchange unit 21 is dirty, it is also possible to determine whether the outdoor heat exchange unit 13 is dirty or not based on time-series data regarding the temperature difference ΔT between outdoor suction air temperature and outdoor outlet temperature.

Figure 2:
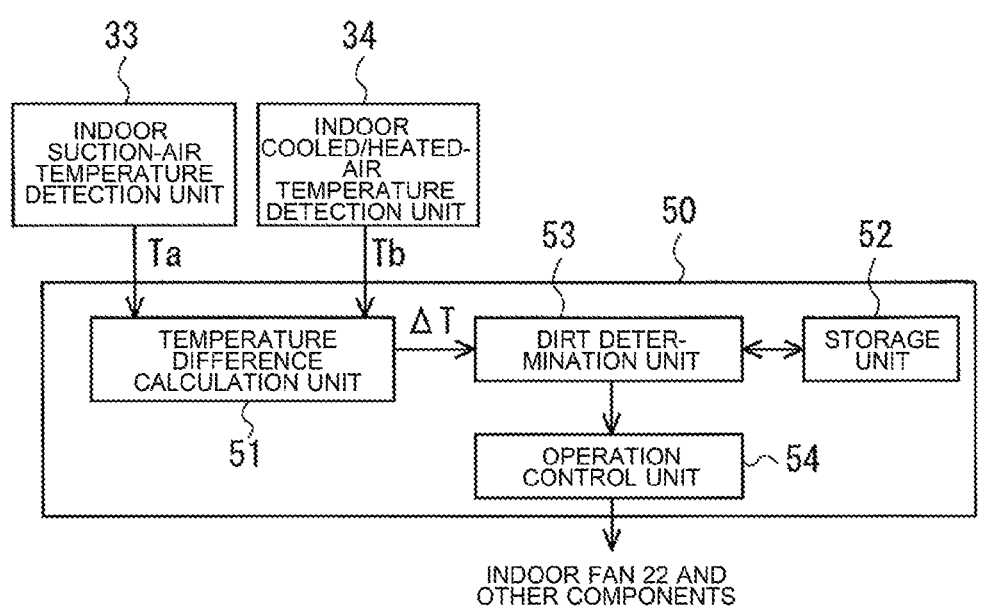
FIG. 2 is a functional block diagram illustrating an example of the configuration of an indoor control device as illustrated in FIG. 1.

FIG. 2 is a functional block diagram illustrating an example of the configuration of the indoor control device 50 as illustrated in FIG. 1. The indoor control device 50 as illustrated in FIG. 2 has a function of determining whether the indoor heat exchange unit 21 is dirty or not based on time-series data regarding the temperature difference ΔT between the indoor suction-air temperature Ta and indoor cooled/heated-air temperature Tb. The indoor control device 50 includes a temperature difference calculation unit 51, a dirt determination unit 53, a storage unit 52, and an operation control unit 54.

The temperature difference calculation unit 51 calculates at different times, the temperature difference ΔT between the indoor suction-air temperature Ta detected by the indoor suction-air temperature detection unit 33 and the indoor cooled/heated-air temperature Tb detected by the indoor cooled/heated-air temperature detection unit 34, and acquire data on the temperature difference ΔT at different times. For example, in the case where the indoor suction-air temperature Ta and the indoor cooled/heated-air temperature Tb are detected at regular intervals, each time the indoor suction-air temperature Ta and the indoor cooled/heated-air temperature Tb are detected the temperature difference calculation unit 51 calculates the temperature difference ΔT between the detected indoor suction-air temperature Ta and indoor cooled/heated-air temperature Tb, and stores data on the calculated temperature difference ΔT in the storage unit 52. The storage unit 52 stores times at which data on the temperature differences ΔT are acquired and the temperature differences ΔT such that the data on the temperature differences ΔT are time series.

The dirt determination unit 53 determines whether the indoor heat exchange unit 21 is dirty or not based on time-series data regarding the temperature difference ΔT stored in the storage unit 52. When the temperature difference ΔT continuously falls within the range of a set temperature zone Tbd for a time period longer than a set determination period Pref, the dirt determination unit 53 determines that the indoor heat exchange unit 21 is dirty.

In particular, the dirt determination unit 53 has a function of determining the set temperature zone Tbd based on a temperature level of the indoor suction-air temperature Ta. For instance, during a cooling operation, when a cooling load is high, the indoor suction-air temperature Ta and an indoor set temperature greatly differ from each other. As a result, the temperature difference ΔT between the indoor suction-air temperature Ta and the indoor cooled/heated-air temperature Tb is also great. By contrast, when the indoor suction-air temperature Ta is in the vicinity of the indoor set temperature, the temperature difference ΔT between the indoor suction-air temperature Ta and the indoor cooled/heated-air temperature Tb is small. However, under any condition, the temperature difference ΔT calculated when the indoor heat exchange unit 21 is dirty is different from that when the indoor heat exchange unit 21 is normal. Thus, the dirt determination unit 53 stores a determination table that indicates indoor suction-air temperatures Ta classified into a plurality of temperature levels and the different set temperature zones Tbd for the plurality of the temperature levels. The dirt determination unit 53 selects a set temperature zone Tbd based on the temperature level of the indoor suction-air temperature Ta, and determines whether dirt is present or absent, referring to the selected set temperature zone Tbd.

It is described above by way of example that the set temperature zone Tbd varies in accordance with the indoor suction-air temperature Ta. However, not the set temperature zone Tbd but the set determination period Pref may vary in accordance with the indoor suction-air temperature Ta. Alternatively, both the set temperature zone Tbd and the set determination period Pref may vary in accordance with the indoor suction-air temperature Ta.

The dirt determination unit 53 may determine that the indoor heat exchange unit 21 is dirty, even when the temperature difference ΔT continuously falls within the range of the set temperature zone Tbd only once for a time period longer than the set determination period Pref. Alternatively, the dirt determination unit 53 may determine that the indoor heat exchange unit 21 is dirty, when the number of times the temperature difference ΔT continuously falls within the range of the set temperature zone Tbd for the time period longer than the set determination period Pref is larger than or equal to a set number of times. It is therefore possible to improve the accuracy of determination of whether dirt is present or absent. Furthermore, the dirt determination unit 53 may be caused to learn with respect to time that is required from time at which the operation is started to time at which the set temperature is reached or the degree of a change in temperature from a steady state, and then determine whether dirt is present or absent.

Furthermore, the dirt determination unit 53 may have a function of determining whether or not the refrigerant is insufficient in amount or the heat exchange unit 21 is dirty, based on the indoor cooled/heated-air temperature Tb. When the refrigerant is insufficient in amount, the air-conditioning apparatus 1 cannot obtain a desired operating capacity, the indoor cooled/heated-air temperature Tb does not drop, and the indoor suction-air temperature Ta (space temperature) does not drop. When the refrigerant is insufficient during the cooling operation of the outdoor unit 10, the indoor cooled/heated-air temperature Tb rises. Thus, based on the indoor cooled/heated-air temperature Tb, the dirt determination unit 53 determines whether the heat exchange at the heat exchange unit 21 is hampered, though the desired operating capacity is obtained, or whether the desired operating capacity is not obtained due to insufficiency of the amount of the refrigerant.

To be more specific, when the indoor cooled/heated-air temperature Tb is lower than a set threshold, the dirt determination unit 53 determines that the refrigerant is not insufficient in amount. In this case, the dirt determination unit 53 determines whether the heat exchange unit 21 is dirt or not based on a change of the temperature difference ΔT that is made with the passage of time, as described above. By contrast, when the indoor cooled/heated-air temperature Tb is higher than or equal to the set threshold, even if the temperature difference ΔT falls within the range of the set temperature zone Tbd, the dirt determination unit 53 determines that the desired operating capacity is not obtained and the refrigerant is insufficient in amount. It is therefore possible to accurately detect whether a failure or an abnormality occurs because of dirt on the heat exchange unit 21 or because of insufficiency of the refrigerant.

Alternatively, the dirt determination unit 53 may have a function of determining whether the refrigerant is insufficient or the outdoor heat exchange unit 13 is dirty, when a change of the indoor suction-air temperature Ta that is made with the passage of time falls within a predetermined range, and the temperature difference ΔT continuously falls with the range of the refrigerant-amount set temperature zone for a predetermined time period. Furthermore, the dirt determination unit 53 may acquire information on the outdoor suction air temperature or weather information to determine whether or not the outside temperature reaches an abnormal temperature higher than a threshold, and may determine that the refrigerant is insufficient, in the case where the outside temperature is not abnormal and the temperature difference ΔT gradually decreases with the passage of time.

The operation control unit 54 has a function of determining, when it is determined that the heat exchange unit is dirty, the degree of dirt based on acquired time-series data regarding the temperature difference ΔT and controlling the operating capacity based on the degree of dirt in such a manner as to maximize time that is required until the apparatus stops due to abnormality. As a result, it is possible to reduce the frequency of maintenance and also reduce the burden of maintenance.

Figure 3:
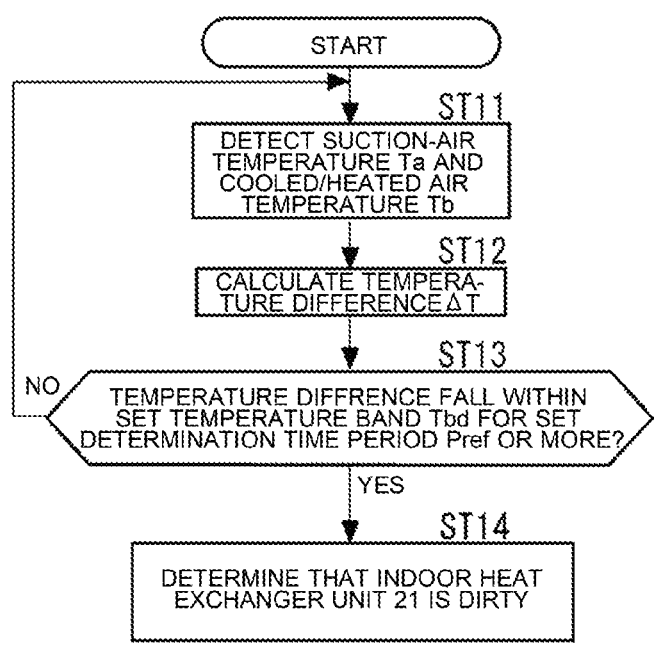
FIG. 3 is a flowchart of an example of an operation of the air-conditioning apparatus as illustrated in FIG. 1.

FIG. 3 is a flowchart indicating an example of an operation of the air-conditioning apparatus according to Embodiment 1. With reference to FIGS. 1 to 3, the example of the operation of the air-conditioning apparatus 1 will be described. It should be noted that FIG. 3 indicates by way of example the case where the air-conditioning apparatus is in cooling operation. First, when the cooling operation starts, high-temperature, high-pressure refrigerant discharged from the compressor 11 flows into the outdoor heat exchange unit 13 through the flow switching device 12 and condenses. The refrigerant that has condensed flows out of the outdoor heat exchange unit 13, and is reduced in pressure by the pressure-reducing device 14. The refrigerant then flows into the indoor heat exchange unit 21.

The refrigerant that has flowed into the indoor heat exchange unit 21 receives heat from indoor air supplied by the indoor fan 22 via the air filter 21b and evaporates. On the other hand, the indoor air is cooled at the indoor heat exchange unit 21 and is blown out as conditioned air into the indoor space. After flowing out of the indoor heat exchange unit 21, the refrigerant flows into the outdoor unit 10 and is re-compressed by the compressor 11.

After the cooling operation described above starts, the indoor space is gradually cooled. Thus, the indoor suction-air temperature Ta drops and the temperature difference ΔT between the indoor suction-air temperature Ta and the indoor cooled/heated-air temperature Tb gradually decreases from the time at which the operation starts. However, if the indoor heat exchanger 21a or the air filter 21b is dirty, heat exchange between the indoor air and the refrigerant is hampered and the temperature difference ΔT does not decrease. Accordingly, the indoor control device 50 determines that the indoor heat exchange unit 21 is dirt.

First, the indoor suction-air temperature detection unit 33 detects the indoor suction-air temperature Ta, and the indoor cooled/heated-air temperature detection unit 34 detects the indoor cooled/heated-air temperature Tb (step ST11). Then, the temperature difference calculation unit 51 of the indoor control device 50 acquires temperature differences ΔT at respective times, and data on the temperature differences are stored in the storage unit 52 (step ST12). The dirt determination unit 53 determines the set temperature zone Tbd based on the indoor suction-air temperature Ta, which is referred to in determination of whether dirt is present or absent. When the temperature difference ΔT continuously falls within the range of the set temperature zone Tbd for a time period longer than or equal to the determined set determination period Pref (YES in step ST13), the dirt determination unit 53 determines that the indoor heat exchange unit 21 is dirty (step ST14). By contrast, when the temperature difference ΔT does not fall within the range of the set temperature zone Tbd or the time period for which the temperature difference ΔT falls within the range of the set temperature zone Tbd is shorter than the set determination period Pref (NO in step ST13), the dirt determination unit determines that this is caused by a temporary environmental change and the indoor heat exchange unit 21 is not dirty, and then continues to make determination of whether dirt is present or absent (steps ST11 to ST13).

In Embodiment 1, since it is determined whether the indoor heat exchange unit 21 is dirty or not based on time-series data regarding the temperature difference ΔT, it is possible to accurately determine whether the indoor heat exchange unit 21 is dirty or not. That is, in the case where it is determined whether dirt is present or absent based on a single preset threshold as in an existing air-conditioning apparatus, even if the air filter 21b is not dirty, the higher an environmental load, the higher the suction air temperature, as a result of which the temperature difference ΔT increases. Thus, in the case where the temperature difference ΔT between two points is compared with the set threshold to determine whether the air filter 21b is dirty or not, an erroneous detection may occur due to environment conditions, and it is thus not possible to accurately detect whether dirty is present or absent. By contrast, in the case where it is determined whether the indoor heat exchange unit 21 is dirty or not based on time-series data regarding the temperature difference ΔT, it is possible to prevent occurrence of erroneous detection of dirt that would be caused by a temporary environmental change, and accurately determine whether the indoor heat exchange unit 21 is dirty or not.

In particular, the indoor control device 50 determines the set temperature zone Tbd based on the indoor suction-air temperature Ta, and determines that the indoor heat exchange unit 21 is dirty, when the temperature difference ΔT continuously falls within the range of the set temperature zone Tbd for a time period longer than the determined set determination period Pref. Thus, it is possible to determine whether dirt is present or absent, using an optimal set temperature zone Tbd that varies in accordance with the environmental load, and thus more accurately determine whether dirt is present or absent.

The indoor control device 50 determines that the indoor heat exchange unit 21 is dirty, when the number of times a time period for which the temperature difference ΔT continuously falls within the range of the set temperature zone Tbd is longer than the set determination period Pref is larger than or equal to a set number of times. Thus, it is found that the indoor control device is still dirty even when a time period elapses. It is therefore possible to more accurately whether dirt is present or absent.

The indoor control device 50 has a function of determining, when it is determined that the indoor heat exchange unit 21 is dirty, the degree of dirt based on acquired time-series data regarding the temperature difference ΔT, and controlling the operating capacity based on the degree of dirt to maximize time that is required until the operation is stopped due to abnormality. Thus, it is possible to reduce the frequency of maintenance, and reduce the burden of maintenance.

Embodiment 2

In Embodiment 1 described above, the indoor control device 50 determines whether dirt is present or absent based on time-series data regarding the temperature difference ΔT, but may determine whether dirt is present or absent based on a change in the cooled/heated air temperature that is made with the passage of time. That is, when the indoor suction-air temperature Ta is in the vicinity of the indoor set temperature, the temperature difference ΔT between the indoor suction-air temperature Ta and the indoor cooled/heated-air temperature Tb decreases to a small value, as described above. At the same time, if the indoor heat exchange unit 21 is dirty, the heat exchange between the indoor air and the refrigerant at the indoor heat exchange unit 21 is hampered and the indoor cooled/heated-air temperature Tb of the indoor heat exchanger 21a drops with the passage of time.

In view of the above, the indoor control device 50 acquires at different times, data regarding the indoor suction-air temperature Ta detected by the indoor suction-air temperature detection unit 33 and the indoor cooled/heated-air temperature Tb detected by the indoor cooled/heated-air temperature detection unit 34, and determines whether the indoor heat exchange unit 21 is dirty or not based on the indoor suction-air temperature and the change in indoor cooled/heated-air temperature Tb that is made with the passage of time. In particular, the indoor control device 50 determines a set temperature zone based on the indoor suction-air temperature Ta, and determines that the heat exchange unit is dirty, when the change in indoor cooled/heated-air temperature Tb that is made with the passage of time continuously falls within the range of the set temperature zone for a time period longer than the determined set determination period. In this case, the dirt determination unit 53 determines the set temperature zone based on a determination table as in Embodiment 1.

For example, during the cooling operation, when the indoor suction-air temperature Ta is in the vicinity of the set temperature, the indoor cooled/heated-air temperature Tb (the temperature of the indoor heat exchanger 21a) drops as the degree of dirt increases. It is therefore possible to determine that the filter needs to be cleaned, based on the indoor cooled/heated-air temperature Tb only.

In Embodiment 2 described above, since it is determined whether the indoor heat exchange unit 21 is dirt or not based on time-series data on the change in the indoor cooled/heated-air temperature Tb, it is possible to accurately detect whether the indoor heat exchange unit 21 is dirt or not. In particular, the indoor control device 50 determines a set temperature zone Tbd based on the indoor suction-air temperature Ta, and determines that the indoor heat exchange unit 21 is dirty when the temperature difference $\Delta T$ continuously falls within the range of the set temperature zone Tbd for a time period longer than the determined set determination period Pref. It is therefore possible to determine whether dirt is present or absent, using the optimal set temperature zone Tbd that varies in accordance with the environmental load, and thus more accurately determine whether dirt is present or absent. It should be noted that in Embodiment 2, the dirt determination unit 53 may have a function of determining that the refrigerant is insufficient in amount when the indoor cooled/heated-air temperature Tb is higher than or equal to a set threshold, even if the temperature difference $\Delta T$ falls within the range of the set temperature zone Tbd, as in Embodiment 1.

The scope of the present disclosure should not be limited to the embodiments described above, and various modifications can be made. In Embodiments 1 and 2 described above, in the case where cooling is required throughout the year in, for example, a server room, the cooling operation may be performed in an environment where the outside air temperature falls below freezing point. In this case, in order to prevent the pipes of the indoor unit 20 from freezing, a known freeze-prevention protection mode is applied. By contrast, if the indoor heat exchange unit 21 is dirty, when the temperature of the indoor heat exchanger 21a excessively drops, the freeze-prevention mode may be applied. Thus, the indoor control device 50 may determine whether dirt is present or absent in consideration of the number of times the apparatus enters the freeze-prevention protection mode.

If the indoor suction-air temperature Ta (the room temperature) is not high, the temperature difference $\Delta T$ does not continuously change for a certain time period. The same is true of the indoor cooled/heated-air temperature Tb. However, when the degree of dirt on the filter increases, the indoor cooled/heated-air temperature Tb greatly changes with the passage of time. Since the number of times the apparatus enters the freeze-proof protection mode also decreases, a threshold for the number of times the apparatus enters the freeze protection mode, which is used in the determination, can be changed based on the condition of the room temperature. Furthermore, the above determination can be made based on only whether the number of times the apparatus enters the freeze-proof protection mode decreases or not, without referring to the indoor suction-air temperature Ta.

In Embodiment 1 described above, in the case where a plurality of air-conditioning apparatuses 1 are installed in the same place, for example, in the same room or at the same rooftop, it is possible to perform maintenance of the apparatuses in a predetermined cycle by preventing the capacities of the apparatuses from becoming insufficient, in consideration of a cleaning maintenance timing, that is, by controlling the capacities of the apparatuses such that even if the capacity of an air-conditioning apparatus decreases, the capacity of another air-conditioning apparatus is increased. In such a manner, a time schedule is adjusted such that the plurality of the apparatuses are successively subjected to maintenance at regular time intervals, and maintenance labor costs can thus be reduced.

In the case where such an abnormality as described above is detected and as a result, a maintenance timing is determined, the capacities of the air-conditioning apparatuses may be adjusted in such a manner as to maximize the time interval between maintenance works, while preventing the capacities of the air-conditioning apparatuses being insufficient. In this case, since a high electricity cost is required, when the apparatus needs to constantly operate in an environment in which a capacity range with a low cost-of-performance (COP) ratio (in a small-capacity model, a capacity range in which the rotation speed of a compressor is high) is used, the apparatus gives a notice.

Furthermore, the above descriptions regarding Embodiments 1 and 2 are made by referring to by way of example the case where the operation is the cooling operation; however, it is also possible to determine during the heating operation whether the outdoor heat exchange unit 13 or the indoor heat exchange unit 21 is dirty or not, as during the cooling operation. In Embodiment 1, during the cooling operation, the temperature difference $\Delta T$ is calculated by subtracting the indoor cooled/heated-air temperature Tb from the indoor suction-air temperature Ta, whereas during the heating operation, the temperature difference $\Delta T$ is calculated by subtracting the indoor suction-air temperature Ta from the indoor cooled/heated-air temperature Tb. In Embodiment 2, during the cooling operation, the change in temperature is calculated by subtracting a current indoor cooled/heated-air temperature Tb from a past indoor cooled/heated-air temperature Tb, whereas during the heating operation, the change in temperature is calculated by subtracting the past indoor cooled/heated-air temperature Tb from the current cooled/heated air temperature.

REFERENCE SIGNS LIST 1 air-conditioning apparatus 10 outdoor unit 11 compressor 12 flow switching device 13 outdoor heat exchange unit 14 pressure-reducing device 15 outdoor fan 20 indoor unit 21 indoor heat exchange unit 21a indoor heat exchanger 21b air filter 22 indoor fan 31 outdoor suction-air temperature detection unit 32 outdoor cooled/heated-air temperature detection unit 33 indoor suction-air temperature detection unit 34 indoor cooled/heated-air temperature detection unit 40 outdoor control device 50 indoor control device 51 temperature difference calculation unit 52 storage unit 53 dirt determination unit 54 operation control unit Pref set determination period Ta indoor suction-air temperature Tb indoor cooled/heated-air temperature Tbd set temperature zone $\Delta T$ temperature difference

The invention claimed is:
1. An air-conditioning apparatus comprising:
a suction-air temperature detection sensor configured to detect a temperature of air that is sucked into a heat exchange unit or a temperature of space to be subjected to heat exchange as a suction air temperature;

a cooled/heated-air temperature detection sensor configured to detect a temperature of air blown from the heat exchange unit or a temperature of the heat exchange unit as a cooled/heated air temperature; and a control device, that includes a microcomputer or a hardware circuit, configured to acquire data on a temperature difference between the suction air temperature detected by the suction-air temperature detection sensor and the cooled/heated air temperature detected by the cooled/heated-air temperature detection sensor at different times as time-series data, and determine whether the heat exchange unit is dirty or not based on the time-series data regarding the temperature difference, wherein the control device determines a set temperature zone based on the suction air temperature, and determines that the heat exchange unit is dirty, when the temperature difference continuously falls within a range of the determined set temperature zone for a time period longer than a determined set determination period, wherein the control device automatically controls operation of the heat exchange unit based on whether the heat exchange unit is determined to be dirty based on the temperature difference continuously falling within the range for the time period longer than the predetermined set determination period.

2. An air-conditioning apparatus comprising:

a suction-air temperature detection sensor configured to detect a temperature of air that is sucked into a heat exchange unit or a temperature of space to be subjected to heat exchange as a suction air temperature;

a cooled/heated-air temperature detection sensor configured to detect a temperature of air blown from the heat exchange unit or a temperature of the heat exchange unit as a cooled/heated air temperature; and a control device, that includes a microcomputer or a hardware circuit, configured to acquire data on a temperature difference between the suction air temperature detected by the suction-air temperature detection sensor and the cooled/heated air temperature detected by the cooled/heated-air temperature detection sensor at different times as time-series data, and determine whether the heat exchange unit is dirty or not based on the time-series data regarding the temperature difference, wherein the control device determines that the heat exchange unit is dirty, when the number of times in a pre-defined time period that the temperature difference continuously falls within a range of a set temperature zone for longer than a set determination period is greater than or equal to a set number of times, wherein the control device automatically controls operation of the heat exchange unit based on whether the heat exchange unit is determined to be dirty based on the number of times in the pre-defined time period that the temperature difference continuously falls within the range for longer than the set determination period being greater than or equal to the set number of times.

3. The air-conditioning apparatus of claim 1, wherein the control device has a function of determining that refrigerant is insufficient, when the cooled/heated air temperature is higher than or equal to a set threshold, even though the temperature difference falls within a range of a set temperature zone.

4. An air-conditioning apparatus comprising:

a suction-air temperature detection sensor configured to detect a temperature of air that is sucked into a heat exchange unit or a temperature of space to be subjected to heat exchange as a suction air temperature;

a cooled/heated-air temperature detection sensor configured to detect a temperature of air blown from the heat exchange unit or a temperature of the heat exchange unit as a cooled/heated air temperature; and a control device, that includes a microcomputer or a hardware circuit, configured to acquire data regarding the suction air temperature detected by the suction-air temperature detection sensor and the cooled/heated air temperature detected by the cooled/heated-air temperature detection sensor at different times, and determines whether the heat exchange unit is dirty or not based on the suction air temperature and a change in the indoor cooled/heated-air temperature that is made with a passage of time, wherein the control device determines a set temperature zone based on the suction air temperature, and determines that the heat exchange unit is dirty, when the change in the indoor cooled/heated-air temperature that is made with the passage of time continuously falls within a range of the set temperature zone for a time period longer than the determined set determination period, wherein the control device automatically controls operation of the heat exchange unit based on whether the heat exchange unit is determined to be dirty based on change in the indoor cooled/heated-air temperature made with the passage of time continuous continuously falling within the range for longer than the determined set determination period.

5. The air-conditioning apparatus of claim 4, wherein the control device has a function of determining that refrigerant is insufficient in amount, when the cooled/heated air temperature is higher than or equal to a set threshold level, even though the change in the indoor cooled/heated-air temperature that is made with the passage of time falls within a range of a set temperature zone.

6. The air-conditioning apparatus of claim 1, wherein the control device has a function of controlling an operating capacity of the air-conditioning apparatus in such a manner as to maximize time that is required until the air-conditioning apparatus stops because of occurrence of an abnormality, when the control device determines that the heat exchange unit is dirty.

7. The air-conditioning apparatus of claim 1, wherein the heat exchange unit includes an indoor heat exchanger and an air filter configured to remove dust from air that flows into the indoor heat exchanger, and the heat exchange unit is installed in an indoor unit.

8. The air-conditioning apparatus of claim 1, wherein the heat exchange unit includes an outdoor heat exchanger, and is installed in an outdoor unit.

* * * * *